US012681926B2

(12) United States Patent
Niu et al.

(10) Patent No.: US 12,681,926 B2
(45) Date of Patent: Jul. 14, 2026

(54) PROCESSING GROUP-BY OPERATIONS IN DATABASES

(71) Applicant: Beijing Zitiao Network Technology Co., Ltd., Beijing (CN)

(72) Inventors: Yongchuan Niu, Beijing (CN); Dong Yin, Beijing (CN); Haohao Qian, Beijing (CN); Xu He, Beijing (CN); Li Wang, Beijing (CN); Qiang Yan, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 19/024,908

(22) Filed: Jan. 16, 2025

(65) Prior Publication Data

US 2025/0384032 A1      Dec. 18, 2025

Related U.S. Application Data

(63) Continuation of application No. PCT/CN2024/099371, filed on Jun. 14, 2024.

(51) Int. Cl.
*G06F 16/242* (2019.01)
*G06F 16/22* (2019.01)
*G06F 16/28* (2019.01)

(52) U.S. Cl.
CPC ........ *G06F 16/244* (2019.01); *G06F 16/2237* (2019.01); *G06F 16/284* (2019.01)

(58) Field of Classification Search
CPC ... G06F 16/244; G06F 16/2237; G06F 16/284

(Continued)

(56) References Cited

U.S. PATENT DOCUMENTS 12,067,048 B1 *   8/2024   Blaney ................... G06F 16/58
2023/0053566 A1 *   2/2023   Horne ................ G06F 21/6227
(Continued)

FOREIGN PATENT DOCUMENTS

CN      108701198 A      10/2018
CN      112765657 A      5/2021
(Continued)

OTHER PUBLICATIONS

International Search Report in International Appln. No. PCT/CN2024/099371, mailed on Feb. 19, 2025, 3 pages.
(Continued)

*Primary Examiner* — Kuen S Lu
(74) *Attorney, Agent, or Firm* — Fish & Richardson P.C.

(57) ABSTRACT

The present disclosure involves methods, apparatus, and systems for processing group-by operations in databases. In one example, a method includes receiving a query to perform a group-by operation based on first attributes and second attributes of a plurality of entities. The first attributes are private data owned by a first participant of a secure multi-party computation (MPC), and the second attributes are private data owned by a second participant of the secure MPC. The method further includes performing one-hot encoding on the first attributes to generate encoded first attributes, and calculating, based on secure MPC, a secret share of a dataset. The dataset includes the first set of numbers and the second attributes. The method further includes performing the group-by operation including arranging the plurality of entities into groups based on at least the encoded first attributes, and aggregating the second attributes of entities in each of the groups.

20 Claims, 16 Drawing Sheets

(58) Field of Classification Search
   USPC ......................................................... 707/737
   See application file for complete search history.

(56)                      References Cited

U.S. PATENT DOCUMENTS

2024/0184577 A1 *  6/2024  Kikuchi .................. H04L 9/008
2024/0362243 A1 * 10/2024  Huang ................ G06F 21/6245
2025/0272585 A1 *  8/2025  Wang ..................... G06N 3/045

FOREIGN PATENT DOCUMENTS

| CN | 114327371 A | 4/2022 |
|---|---|---|
| CN | 117827892 A | 4/2024 |
| CN | 117972798 A | 5/2024 |
| CN | 118070308 A | 5/2024 |
| CN | 118114289 A | 5/2024 |

OTHER PUBLICATIONS

International Search Report in International Appln. No. PCT/CN2024/099399, mailed on Mar. 5, 2025, 4 pages.

* cited by examiner

| ID | A1 | A2 | D1 | D2 | D3 | Column C |
|----|----|----|----|----|----|----------|
| 1 | [1] | [0] | [1] | [0] | [0] | [C1] |
| 2 | [0] | [1] | [1] | [0] | [0] | [C2] |
| 3 | [0] | [1] | [0] | [1] | [0] | [C3] |
| 4 | [1] | [0] | [0] | [0] | [1] | [C5] |
| 5 | [1] | [0] | [1] | [0] | [0] | [C6] |

230

211 212 120

230a

120

| ID | A1 | A2 | D1 | D2 | D3 | Column C |
|----|----|----|----|----|----|----------|
| 4  | [1] | [0] | [0] | [0] | [1] | [C5] |
| 1  | [1] | [0] | [1] | [0] | [0] | [C1] |
| 2  | [0] | [1] | [1] | [0] | [0] | [C2] |
| 3  | [0] | [1] | [0] | [1] | [0] | [C3] |
| 5  | [1] | [0] | [1] | [0] | [0] | [C6] |

| ID | A1,D1 | A1,D2 | A1,D3 | A2,D1 | A2,D2 | A2,D3 | Column C |
|----|-------|-------|-------|-------|-------|-------|----------|
| 1  | [1]   | [0]   | [0]   | [0]   | [0]   | [0]   | [C1]     |
| 2  | [0]   | [0]   | [0]   | [1]   | [0]   | [0]   | [C2]     |
| 3  | [0]   | [0]   | [0]   | [0]   | [1]   | [0]   | [C3]     |
| 4  | [1]   | [0]   | [0]   | [0]   | [0]   | [0]   | [C5]     |
| 5  | [0]   | [0]   | [1]   | [0]   | [0]   | [0]   | [C6]     |

| ID | A+D | A+D=0 | A+D=1 | A+D=2 | A+D=3 | A+D=4 | A+D=5 | Column C |
|----|-----|-------|-------|-------|-------|-------|-------|----------|
| 1 | [0] | [1] | [0] | [0] | [0] | [0] | [0] | [C1] |
| 2 | [3] | [0] | [0] | [0] | [1] | [0] | [0] | [C2] |
| 3 | [4] | [0] | [0] | [0] | [0] | [1] | [0] | [C3] |
| 4 | [0] | [1] | [0] | [0] | [0] | [0] | [0] | [C5] |
| 5 | [2] | [0] | [0] | [1] | [0] | [0] | [0] | [C6] |

| ID | A+D | A+D=0 | A+D=1 | A+D=2 | A+D=3 | A+D=4 | A+D=5 | Column C |
|----|-----|-------|-------|-------|-------|-------|-------|----------|
| 1 | [0] | [C1] | [0] | [0] | [0] | [0] | [0] | [C1] |
| 2 | [3] | [0] | [0] | [0] | [C2] | [0] | [0] | [C2] |
| 3 | [4] | [0] | [0] | [0] | [0] | [C3] | [0] | [C3] |
| 4 | [0] | [C5] | [0] | [0] | [0] | [0] | [0] | [C5] |
| 5 | [2] | [0] | [0] | [C6] | [0] | [0] | [0] | [C6] |

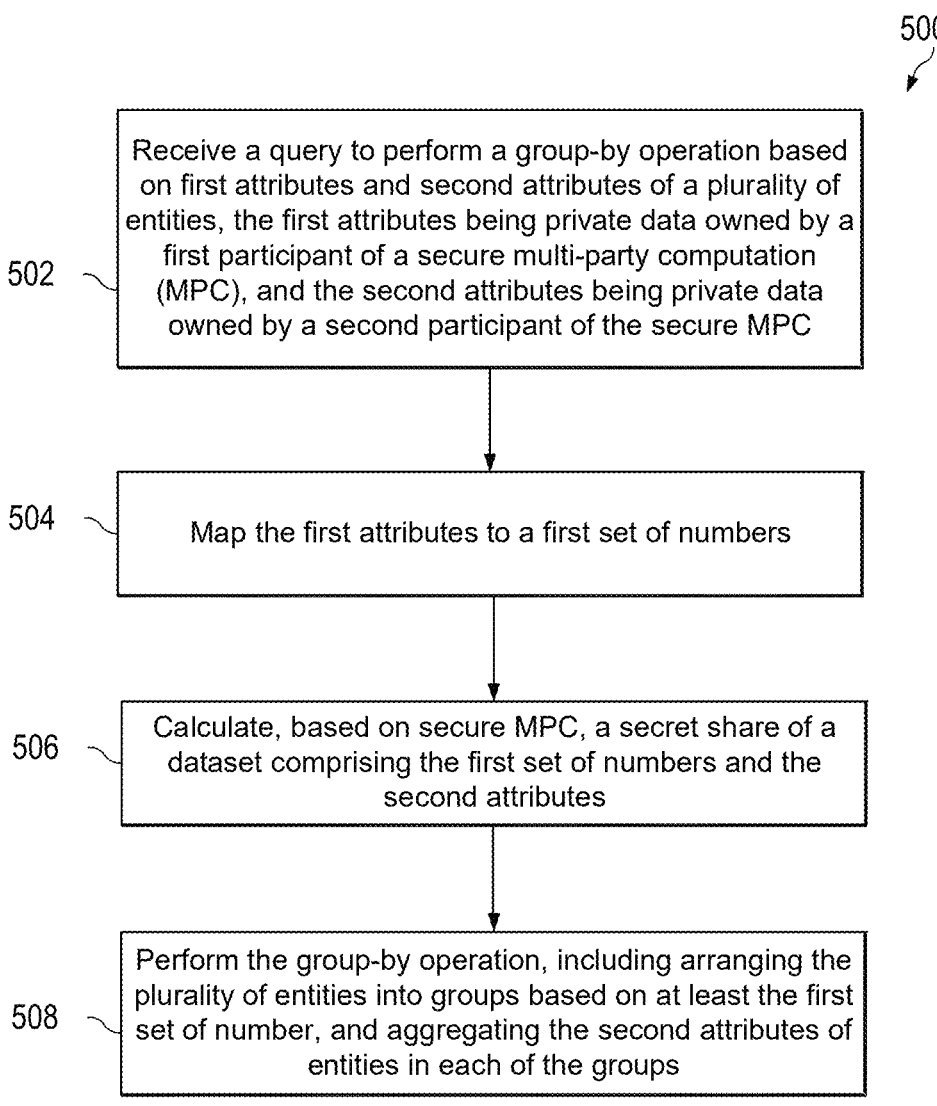

502 — Receive a query to perform a group-by operation based on first attributes and second attributes of a plurality of entities, the first attributes being private data owned by a first participant of a secure multi-party computation (MPC), and the second attributes being private data owned by a second participant of the secure MPC 504 — Map the first attributes to a first set of numbers 506 — Calculate, based on secure MPC, a secret share of a dataset comprising the first set of numbers and the second attributes 508 — Perform the group-by operation, including arranging the plurality of entities into groups based on at least the first set of number, and aggregating the second attributes of entities in each of the groups

FIG. 5

PROCESSING GROUP-BY OPERATIONS IN DATABASES

This application claims priority under 35 USC § 120 to the Patent Cooperation Treaty Patent Application Serial No. PCT/CN2024/099371, filed on Jun. 14, 2024, the entire contents of which are hereby incorporated by reference.

TECHNICAL FIELD

The present disclosure generally relates to data processing, and in particular, processing group-by operations in databases.

BACKGROUND

Data plays an increasingly important role in modern society, driving advancements across various sectors. Effective collaboration among data custodians can be beneficial to the value of data. On the other hand, data collaboration may be compromised by isolated data silos due to the control of data by different entities, regulatory compliance on data privacy across countries, and frequent privacy breaches, etc. Secure multi-party computation (MPC) is a technique developed to address some of the issues in data collaborations. MPC allows parties to jointly evaluate or analyze their respective private data without sharing the private data with others. Thus, data privacy of each party is protected. As data volumes increase, the computational and communication complexities of MPC also escalate significantly. Therefore, MPC protocols are also developed for specific use scenarios to meet practical data security and computational needs.

SUMMARY

The present disclosure relates to data processing, and in particular, processing group-by operations in databases. One aspect of the present disclosure provides a computer-implemented method including receiving a query to perform a group-by operation based on first attributes and second attributes of a plurality of entities. The first attributes are private data owned by a first participant of a secure multi-party computation (MPC), and the second attributes are private data owned by a second participant of the secure MPC. The method further includes performing one-hot encoding on the first attributes to generate encoded first attributes, and calculating, based on secure MPC, a secret share of a dataset. The dataset includes the first set of numbers and the second attributes. The method further includes performing the group-by operation including arranging the plurality of entities into groups based on at least the encoded first attributes, and aggregating the second attributes of entities in each of the groups.

In some implementations, the first attributes are stored in a first database accessed by the first participant, and the second attributes are stored in a second database accessed by the second participant.

In some implementations, the first attributes include non-numerical data, and the second attributes include numerical data.

In some implementations, the first attributes belong to N1 categories. Performing the one-hot encoding on the first attributes includes generating, for each of the first attributes, a binary vector based on a category of the corresponding first attribute. A length of the binary vector equals N1, where N1 is a positive integer.

In some implementations, the method further includes performing one-hot encoding on third attributes to generate encoded third attributes. The third attributes are private data owned by the second participant. The dataset further includes the encoded third attributes. Performing the group-by operation includes arranging the plurality of entities into groups based on the encoded first attributes and the encoded third attributes.

In some implementations, the third attributes belong to N2 categories. Performing the one-hot encoding on the third attributes includes generating, for each of the third attributes, a binary vector based on a category of the corresponding third attribute. A length of the binary vector equals N2, where N2 is a positive integer.

In some implementations, calculating the secret share of the dataset includes arranging the second attributes in a descending order, and sorting the entities in the dataset corresponding to the arranged second attributes.

In some implementations, sorting the entities in the dataset includes receiving a permutation that indicates an order of the arranged second attributes, and applying the permutation to the secret share of the dataset.

In some implementations, the first database and the second database are relational databases, and the query is a Structured Query Language (SQL) query.

In some implementations, aggregating the second attributes of entities in each group is based on one of a sum, maximum, minimum, count, count distinct, or percentile function of the SQL query.

In some implementations, the first participant is a first data center of a content provider, the second participant is a second data center of the content provider. The first attributes and the second attributes include user attributes corresponding to the content provider.

One aspect of the present disclosure provides one or more computer-readable storage media. The one or more computer-readable storage media store one or more instructions that, when executable by one or more computers, cause the one or more computers to perform operations including receiving a query to perform a group-by operation based on first attributes and second attributes of a plurality of entities. The first attributes are private data owned by a first participant of a secure multi-party computation (MPC), and the second attributes are private data owned by a second participant of the secure MPC. The operations further include performing one-hot encoding on the first attributes to generate encoded first attributes, and calculating, based on secure MPC, a secret share of a dataset. The dataset includes the first set of numbers and the second attributes. The operations further include performing the group-by operation including arranging the plurality of entities into groups based on at least the encoded first attributes, and aggregating the second attributes of entities in each of the groups.

One aspect of the present disclosure provides a computer-implemented system including one or more computers and one or more computer memory devices interoperably coupled with the one or more computers. The one or more computer memory devices have computer-readable storage media storing one or more instructions that, when executed by the one or more computers, perform one or more operations including receiving a query to perform a group-by operation based on first attributes and second attributes of a plurality of entities. The first attributes are private data owned by a first participant of a secure multi-party computation (MPC), and the second attributes are private data owned by a second participant of the secure MPC. The operations further include performing one-hot encoding on the first attributes to generate encoded first attributes, and calculating, based on secure MPC, a secret share of a dataset. The dataset includes the first set of numbers and the second attributes. The operations further include performing the group-by operation including arranging the plurality of entities into groups based on at least the encoded first attributes, and aggregating the second attributes of entities in each of the groups.

While generally described as computer-implemented software embodied on tangible media that processes and transforms the respective data, some or all of the aspects can be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

BRIEF DESCRIPTION OF DRAWINGS

FIGS. 2A-2F illustrate an example method of performing a group-by operation based on secure multi-party computation.

FIGS. 4A-4F illustrate another example method of performing a group-by operation based on secure multi-party computation.

FIG. 5 illustrates a flow chart of the example method of performing a group-by operation as shown in FIGS. 4A-4F.

Like reference numbers and designations in the various drawings indicate like elements.

DETAILED DESCRIPTION

Figure 1:
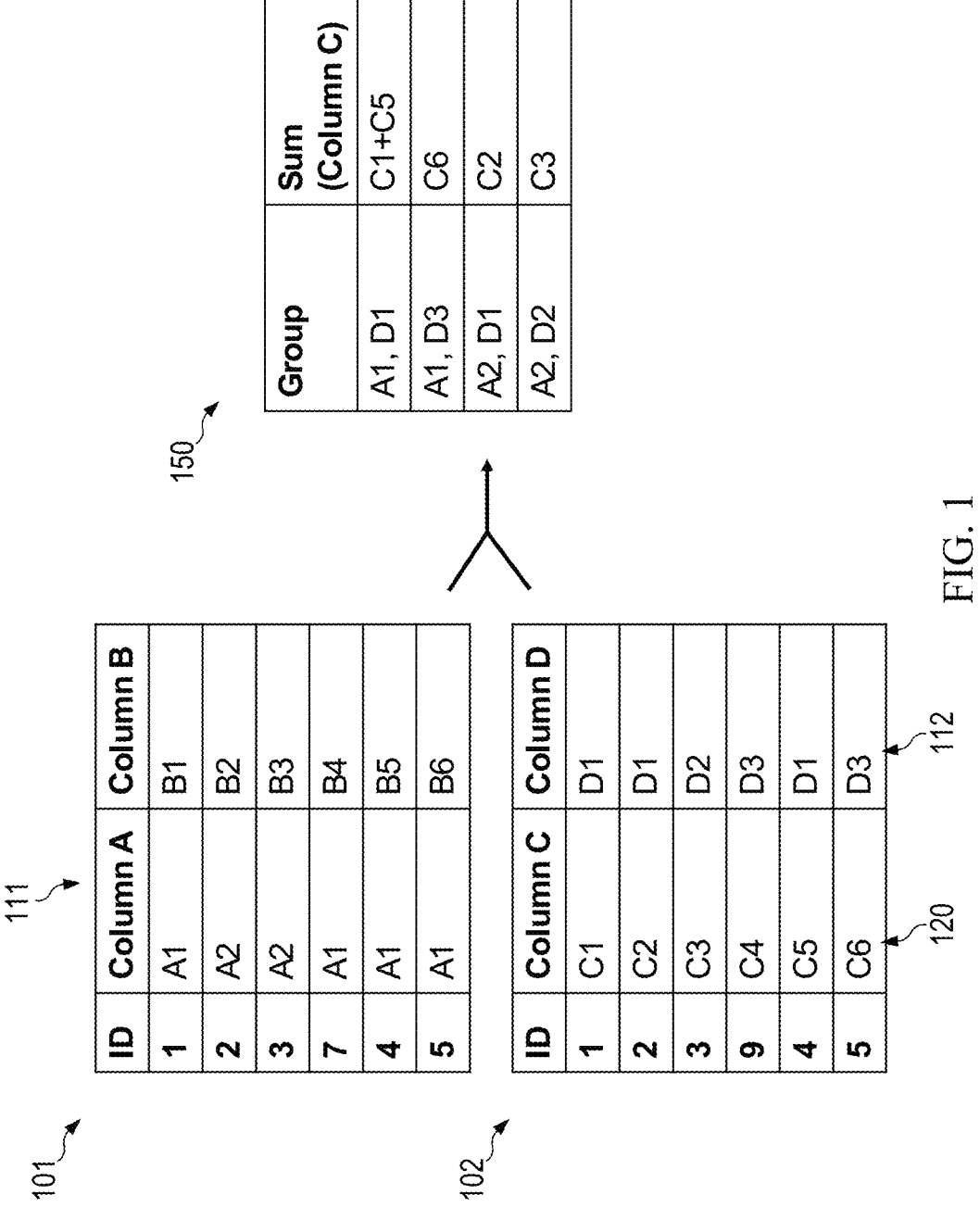
FIG. 1 illustrates an example of a group-by operation.

This specification relates to methods, apparatuses, and systems for processing group-by operations in databases. In a relational database, attributes of a plurality of entities are stored in a relational table. Traditionally, data analysis is performed on one relational table controlled by a single data custodian. The data custodian can perform data analysis using standard Structured Query Language (SQL) queries. As data volume increases, data analysis may need to be performed on more than one relational table controlled by multiple data custodians. For example, such data can be attributes of a plurality of entities distributed among the more than one relational table. Therefore, secure multi-party query protocols are desired for performing data analysis to ensure data privacy of each data custodian.

An example of a secure multi-party query protocol is a query to perform a group-by operation involving multiple databases. The group-by operation can arrange entities into groups according to certain attributes, and provide summary statistics about each group. In some scenarios, "group-by" attributes (e.g., attributes used to arrange entities into groups) and "aggregate attributes" (e.g., attributes that are aggregated for each group to provide summary statistics about the group) are distributed in more than one database controlled by different data custodians. In some cases, the group-by operation is performed based on ciphertext sorting and numerous comparison operations of secure multi-party computation (MPC), which can lead to high computational and communication complexity.

The present disclosure provides techniques to efficiently process group-by operations. Before participating in secure MPC, the data custodian that controls "group-by" attributes can first perform local operation on the "group-by" attributes. In some implementations, the local operation includes mapping the "group-by" attribute of each entity to a number which corresponds to a category that the "group-by" attribute belongs to.

In some implementations, the local operation includes performing one-hot encoding on the "group-by" attributes, thereby converting the "group-by" attribute of each entity into a binary vector. The "group-by" attributes, which are usually in the form of categorical data, can be converted into numerical data that can be processed more easily in secure MPC. As a result, the complexity of multiplication and comparison operations under the group-by operation based on secure MPC can be reduced.

In some implementations, the group-by operation includes sorting a relational table so that the "aggregate" attributes are arranged in order. The sorting can be performed based on an oblivious shuffling protocol, where the data custodian controlling the "aggregate" attributes can provide a permutation indicating a sorting order. Other parties can sort their respective secret shares of the relational table accordingly, for example, by applying the permutation to their respective secret shares. As such, compared to sorting based on ciphertext sorting and numerous comparison operations, sorting using the oblivious shuffling protocol requires less computational complexity.

The techniques described in the present disclosure can achieve one or more technical effects. For example, by performing local operations on the "group-by" attributes, and/or by performing sorting using oblivious shuffling protocol, group-by operations involving multiple databases can be more efficiently performed, so as to reduce computational and communication complexity. The group-by operations can also be securely performed while ensuring data privacy of each data custodian. The described techniques are designed to be secure against a semi-honest adversary with computational limitations, where the adversary adheres to the protocol while attempting to gain additional information about other parties' input data. Additional or different technical effects can be achieved based on the various implementations described in the present disclosure.

The above aspects and some other aspects of the present disclosure are discussed in greater detail below.

FIG. 1 illustrates an example of a group-by operation. A dataset can store attributes of different entities in a tabular format consisting of rows and columns. The attributes can represent properties or characteristics of the entities. In some implementations, the dataset can be a relational table, where a column represents an attribute that defines the type of information stored, and a row (also referred to as a tuple) represents a record containing attributes of a single entity.

In some cases, two or more datasets can have different attributes of the same entities. In some implementations, the datasets are private data owned by different parties, such that the attributes in each dataset cannot be shared with other parties. For example, the datasets may be stored in different databases of different companies, in different jurisdictions, or subject to different data privacy requirements. As shown in FIG. 1, a first party (e.g., a first participant of the secure MPC) owns a first relational table 101 that includes two attributes (e.g., in column A and column B, respectively) of a first group of entities. A second party (e.g., a second participant of the secure MPC) owns a second relational table 102 that includes another two attributes (e.g., in column C and column D, respectively) of a second group of entities. The first group of entities and the second group of entities include overlapping entities with ID 1-5. As such, attributes of the five entities with ID 1-5 are distributedly stored in more than one relational table.

In some cases, a user can send a query to perform a group-by operation on the first relational table 101 and the second relational table 102. The query can be implemented by using a structured query language (SQL), or another language format depending on a data structure and a query language supported by the databases.

The group-by operation is a database operation that groups entities that have same values for specific attributes (e.g., in specific columns) together, which enables the application of aggregate functions, such as SUM, COUNT, COUNT DISTINCT, PERCENTILE, AVG, MAX, and MIN, to each group. As such, a result of the group-by operation can provide summary statistics about entities having specific attributes. Table 1 below illustrates example aggregate functions that may be used in group-by operations.

TABLE 1

Example aggregate functions

| FUNCTION NAME | DESCRIPTION |
| --- | --- |
| SUM | Returns the sum of all values in the column |
| COUNT | Returns the number of rows in the column |
| COUNT DISTINCT | Returns the count of distinct, non-duplicate values in the column |
| PERCENTILE | Returns the value below which a given percentage of observations in the column falls |
| AVG | Returns the average value of the column |
| MAX | Returns the largest value in the column |
| MIN | Returns the smallest value in the column |

For example, as shown in FIG. 1, attributes in Column A in the first relational table 101 are selected as first attributes 111, which are used to group the entities; attributes in Column C in the second relational table 102 are selected as second attributes 120, which will be aggregated to arrive at summary statistics for each group; and attributes in Column D in the second relational table 102 are selected as third attributes 112, which are also used to group the entities. As such, a result of the group-by operation 150 can provide a summary statistic on the second attributes 120 (e.g., a sum of second attributes 120) for each group, where entities in each group have the same first attribute 111 and the same third attribute 112. For example, entities with A1 as the first attribute 111 and D1 as the third attribute 112 are grouped into the first group. A sum of second attributes 120 of all entities in the first group are provided as (C1+C5).

For example, a retail company can have a large amount of transaction data of their customers. For instance, transaction data related to daily necessities may be owned by one branch of the retail company, and transaction data related to high-end services may be owned by another branch of the retail company. The retail company can perform group-by operations based on secure MPC to analyze data from different branches, e.g., to group transactions by customer or by product type. By securely grouping the data, the retail company can analyze purchasing patterns in different consumer sections, without obtaining proprietary customer data from the branches.

As another example, a content provider can have a large amount of data relating to media content or users. Due to operational and regulatory needs, the large amount of data can be distributed in different databases or data centers. For example, individualized information about particular users can be split into different data portions, or into secret shares, and then distributed among different databases. To protect user data, the content provider needs to maintain the privacy of each database, so that data in one database is not directly shared with another database. By performing the group-by operation based on secure MPC, the content provider can analyze data in more than one database to obtain information on characteristics of certain user groups (e.g., average daily screening time for users in college), while keeping individualized information (e.g., daily screening time of particular users) private.

FIGS. 2A-2F illustrate an example method of performing a group-by operation based on secure multi-party computation (MPC).

Figure 2A:
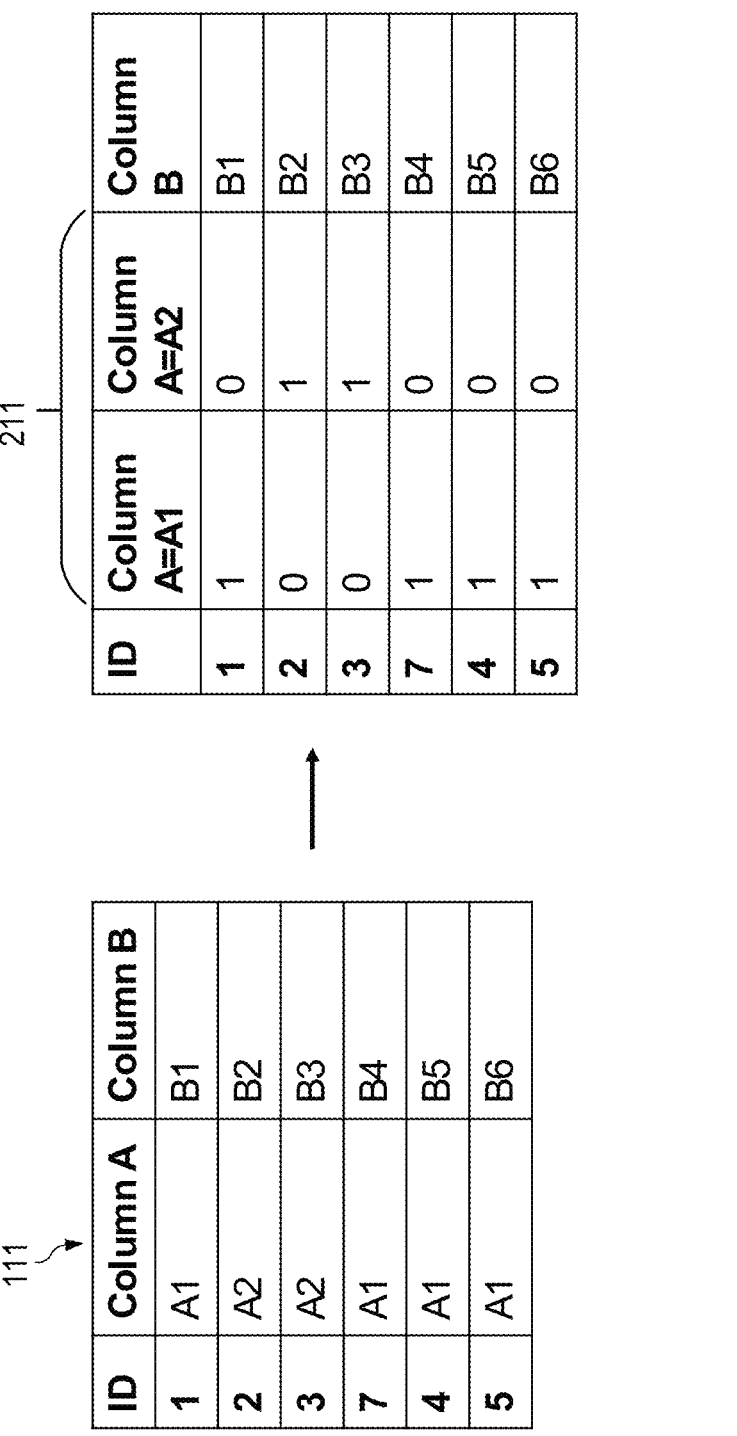

As shown in FIG. 2A, before performing secure MPC, the first party can perform a local operation on the first relational table 101. In some implementations, the first attributes 111 in the first relational table 101 include non-numerical data, e.g., categorical data, that each belong to one of N1 categories. For example, the first attributes 111 each belong to one of two categories, A1 and A2. The local operation includes performing one-hot encoding on the first attributes 111 to generate encoded first attributes 211, such that the non-numerical data are converted to numerical data. Specifically, each category of the first attributes can be represented by a unique binary vector, where one position in the vector is marked with a "1" to indicate the presence of the category, and all other positions in the vector are marked with 0s. A length of the vector is equal to the number of categories (N1). As an example, A1 as the first attribute is converted to a binary vector (1, 0), and A2 as the first attribute is converted to a binary vector (0, 1). As such, the first attributes 111 in non-numerical data are converted into encoded first attributes 211 in numerical data.

The one-hot encoding on the first attributes can be performed based on:

$$L_j\left(s_i^0\right) = \begin{cases} 0, & L_j(k_0) \neq s_i^0 \\ 1, & L_j(k_0) = s_i^0 \end{cases} (0 \leq j < N, 0 \leq i < N1)$$

where $$L_j\left(s_i^0\right)$$

represents a binary bit in the $j^{th}$ row and $i^{th}$ column in the encoded first attributes, $L_j(k_0)$ represents the first attribute 111 in the $j^{th}$ row, $$s_i^0$$

represents the $i^{th}$ category of the N1 categories, N represents the number of entities in the first relational table 101.

Figure 2B:
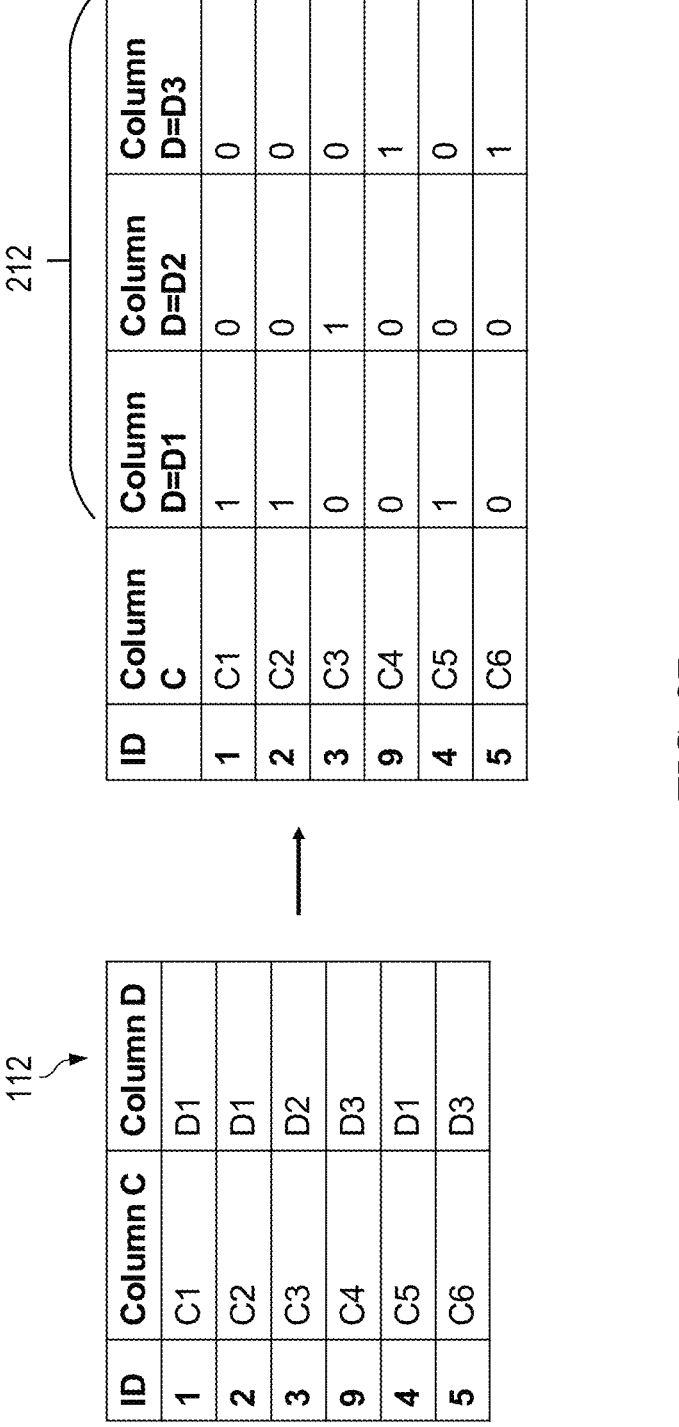

Similarly, as shown in FIG. 2B, before performing secure MPC, the second party can perform a local operation on the second relational table 102. In some implementations, the third attributes 112 in the second relational table 102 include non-numerical data, e.g., categorical data, that each belong to one of N2 categories. For example, the third attributes each belong to one of three categories, D1, D2, and D3. The local operation includes performing one-hot encoding on the third attributes 112 to generate encoded third attributes 212, such that the non-numerical data are converted to numerical data. Specifically, each category of the third attributes can be represented by a unique binary vector, where one position in the vector is marked with a "1" to indicate the presence of the category, and all other positions in the vector are marked with 0s. A length of the vector is equal to a number of categories (N2). As an example, D1 as the third attribute is converted to a binary vector (1, 0, 0), D2 as the third attribute is converted to a binary vector (0, 1, 0), and D3 as the third attribute is converted to binary vector (0, 0, 1). As such, the third attributes 112 in non-numerical data are converted into encoded third attributes 212 in numerical data.

The one-hot encoding on the third attributes can be performed based on:

$$R_j(s_i^1) = \begin{cases} 0, & L_j(k_1) = s_i^1 \\ 1, & L_j(k_1) \neq s_i^1 \end{cases} (0 \leq j < M, 0 \leq i < N2)$$

where $$R_j(s_i^0)$$

represents a binary bit in the $j^{th}$ row and $i^{th}$ column of the encoded third attributes, $L_j(k_1)$ represents the third attribute 112 in the $j^{th}$ row, $$s_i^1$$

represents the $i^{th}$ category of the N2 categories, M represents a number of entities in the second relational table 102.

In some implementations, the second attributes 120 in the second relational table 102 include numerical data that can be directly computable by a computer.

Figure 2C:
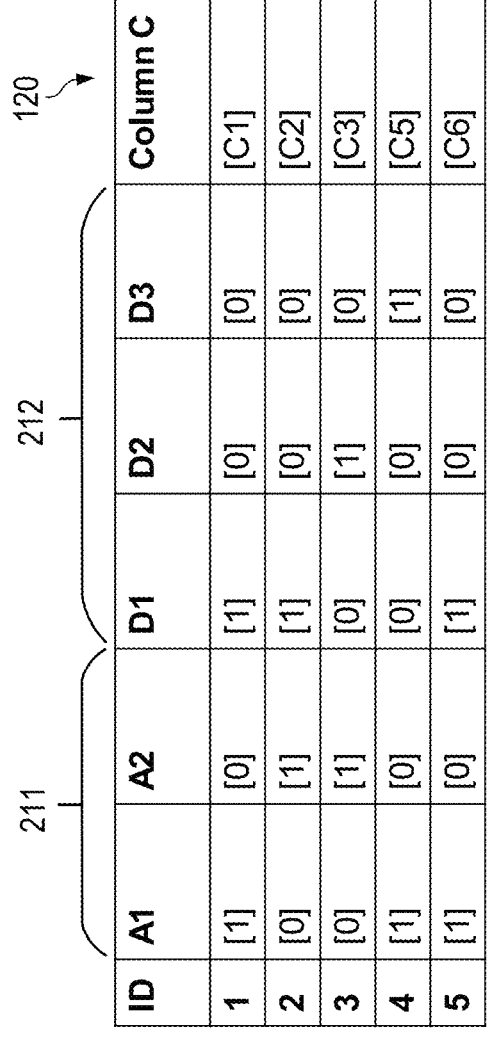

As a next step, as shown in FIG. 2C, a new dataset in the form of a third relational table 230 is generated using secure multi-party computation (MPC). The third relational table 230 includes the encoded first attributes 211, the encoded third attributes 212, and the second attributes 120. The secure MPC can provide a cryptographic protocol that enables multiple parties to jointly compute a function over their private inputs, while ensuring that no individual party can access the others' inputs. For example, the first party and second party can each generate secret shares of their respective relational table, and distribute the secret shares between the parties, so that the third relational table 230 can be generated by concatenating the secret shares. As an example in FIG. 2C, each element (e.g., x) in the third relational table 230 can be split into secret shares (e.g., denoted as [x]). The first party owns a first secret share (e.g., a random number $x_0$), and the second party owns a second secret share (e.g., $x-x_0$), so that no party is in possession of the actual value of the element.

As a more generalized formula, the first party receives a first secret share ($[T]_0$) of the third relational table 230, and the second party receives a second secret share ($[T]_1$) of the third relational table 230, which can be denoted as:

$$[T]_0 = (([S_0^0]_0, [S_1^0]_0, \ldots, [S_{N1-1}^0]_0), [v_0]_0), ([S_0^1]_0, [S_1^1]_0, \ldots, [S_{N2-1}^1]_0),$$

$$[v_1]_0)),$$

and $$[T]_1 = (([S_0^0]_1, [S_1^0]_1, \ldots, [S_{N1-1}^0]_1), [v_0]_1), ([S_0^1]_1, [S_1^1]_1, \ldots, [S_{N2-1}^1]_1),$$

$$[v_1]_1)),$$

where $[X]_0$ represents a first secret share of X, $[X]_1$ represents a second secret share of X, $$S_i^0$$

represents the $i_{th}$ column in the encoded first attributes 211, $$S_i^1$$

represents the $i^{th}$ column in the encoded third attributes 212, $v_0$ represents attributes in the first relational table 101 that will be aggregated (not shown in FIG. 2C), $v_1$ represents attributes in the second relational table 102 that will be aggregated (e.g., second attributes 120).

In some implementations, when the group-by operation includes aggregating second attributes using one of a PERCENTILE or a COUNT DISTINCT function, rows in the third relational table 230 are rearranged according to an ascending order or a descending order of the second attributes 120. In some implementations, the rows in the third relational table 230 can be rearranged based on oblivious shuffling. Oblivious shuffling is a function that allows one party to provide a permutation that provides a specific order, and another party to provide a set of elements, so that the set of elements can be permutated based on secure MPC. The oblivious shuffling can be instantiated using Homomorphic Encryption, garbled circuits, and oblivious switching networks, so that the oblivious shuffling process can preserve the privacy of the input data while achieving the desired permutation. For example, one method of oblivious shuffling includes Secret-Shared Shuffle and Oblivious Switching Network, which utilize a special-purpose preprocessing phase before employing "Share Translation" and "Switching Network" respectively.

As shown in FIG. 2D, rows in the rearranged table 230a are arranged in a way that the second attributes 120 are arranged in descending order. The first party can input permutation $\sigma_0$ and the first secret share ($[T]_0$) of the third relational table 230, and the second party can input the second secret share ($[T]_1$) of the third relational table 230. Then, the first party and second party can execute the oblivious shuffling together to generate secret shares of the rearranged table 230a. For example, the first party receives a first secret share ($[\sigma_0(T)]_0$) of the rearranged table 230a, and the second party receives a second secret share ($[\sigma_0(T)]_1$) of the rearranged table 230a, where:

$$[\sigma_0(T)]_0 = (([\sigma_0(S_0^0)]_0, [\sigma_0(S_1^0)]_0, \dots, [\sigma_0(S_{N1-1}^0)]_0),$$

$$[\sigma_0(v_0)]_0, ([\sigma_0(S_0^1)]_0, [\sigma_0(S_1^1)]_0, \dots, [\sigma_0(S_{N2-1}^1)]_0), [\sigma_0(v_1)]_0;$$

$$[\sigma_0(T)]_1 = (([\sigma_0(S_0^0)]_1, [\sigma_0(S_1^0)]_1, \dots, [\sigma_0(S_{N1-1}^0)]_1),$$

$$[\sigma_0(v_0)]_1, ([\sigma_0(S_0^1)]_1, [\sigma_0(S_1^1)]_1, \dots, [\sigma_0(S_{N2-1}^1)]_1), [\sigma_0(v_1)]_1,$$

where $\sigma_0(X)$ represents applying the permutation do to X.

As a next step, as shown in FIG. 2E, a reconstructed third relational table 231 is generated based on either the third relational table 230 (e.g., when SUM, MAX, MIN, or COUNT is used as the aggregate function), or the rearranged table 230a (e.g., when PERCENTILE or COUNT DISTINCT is used as the aggregate function). The reconstructed third relational table 231 can be generated by multiplying, based on secret MPC, each column in the encoded first attributes 211 with each column in the encoded third attributes 212 to generate multiplication results 232. For example, the multiplication results 232 are generated by:

$$T(s_{i,j}) = T(s_i^0) \cdot T(s_j^1)(0 \le i < N1, 0 \le j < N2)$$

where $s_{i,j}$ represents a column of the multiplication results 232, $$s_i^0$$

represents the $i^{th}$ column of the encoded first attributes 211, and $$s_j^1$$

represents the $j^{th}$ column of the encoded third attributes 212. The first party and the second party each receives a secret share of the multiplication results 232.

As such, based on the multiplication results 232, the entities can be arranged into different groups. For example, when the first column of a row is denoted as 1 (e.g., entity with ID 1 and 5), it means that the entity of this row belongs to the first group having the first attribute as A1 and the second attribute as D1.

Figure 2F:
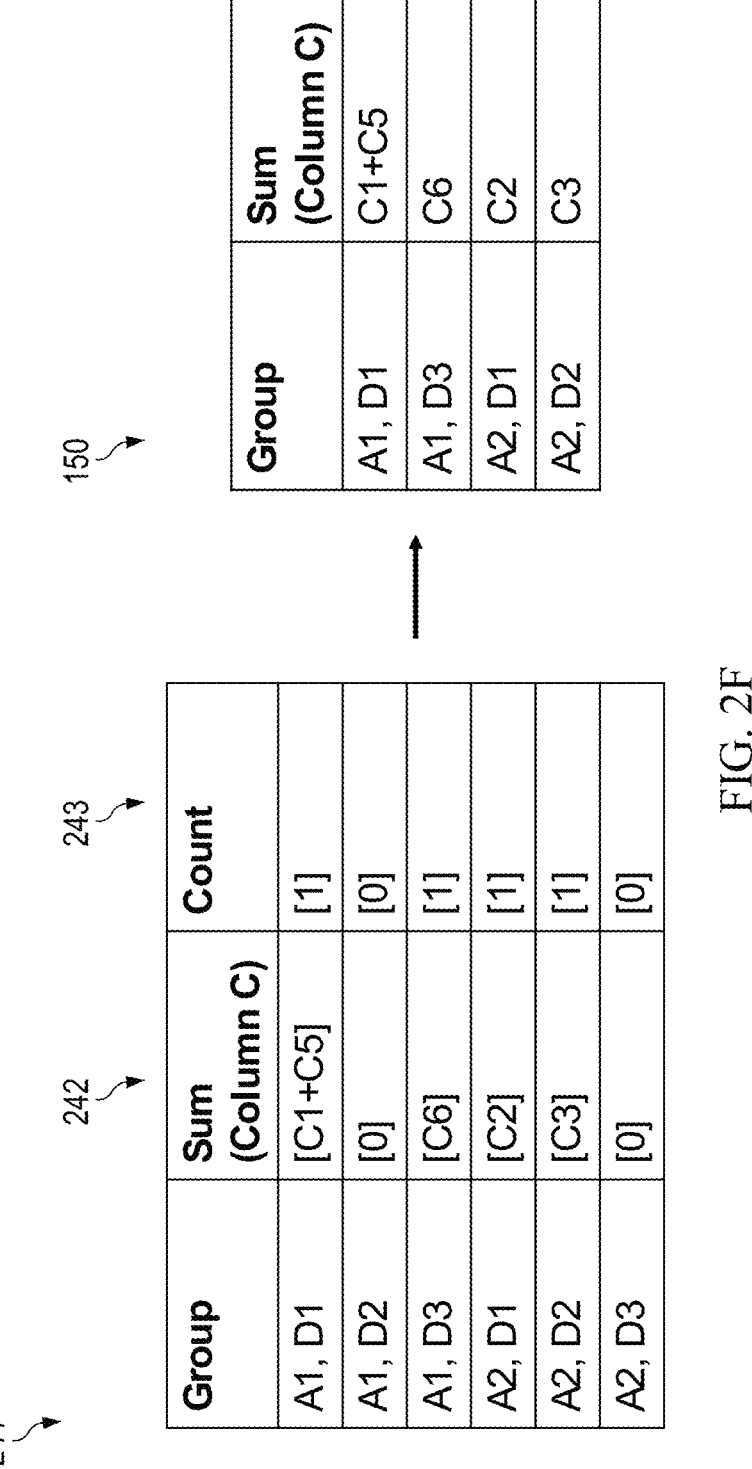

As shown in FIG. 2F, for each group, the second attributes 120 can be aggregated using one of an aggregate function (e.g., SUM, COUNT, COUNT DISTINCT, PERCENTILE, AVG, MAX or MIN). In some implementations, entities with the same first attributes 111 and the same third attributes 112 are arranged into the same group, while entities with different first attributes 111 or different third attributes 112 are arranged into different groups. For example, as shown in relational table 241, entities with A1 as the first attribute and D1 as the third attribute are grouped into a first group. Second attributes 120 of entities in the first group are aggregated to generate an aggregate result 242 (e.g., a sum of second attributes of all entities in the first group).

As a more generalized formula, an aggregation result can be $Agg([T(s_{i,j})] \cdot [T(v_0)])$, or $Agg([T(s_{i,j})] \cdot [T(v_1)])$, where $T(s_{i,j})$ represents the multiplication result 232, $T(v_0)$ represents attributes in the first relational table 101 to be aggregated, and $T(v_1)$ represents attributes in the second relational table 102 to be aggregated (e.g., second attributes 120).

In some implementations, a count 243 (e.g., a quantity) of entities in each group is also computed as a classification identification $f_{i,j}$:

$$f_{i,j} = count(T(s_{i,j}) > 0)(0 \le i < N1, 0 \le j < N2)$$

If the aggregate result 242 of a group is 0 and the count 243 of the groups is also 0, it means that the group is empty, rather than the aggregate result 242 (e.g., a sum, a maximum value, or a minimum value) is actually 0.

As such, the relational table 241 having aggregated attributes for each group is generated. The $n^{th}$ row of the relational table 241 can be, in the form of secret share:

$$[S_{[n]}] = ([S_i^0], [S_j^0], [Agg([T(s_{i,j})] \cdot [T(v_0)])], [Agg([T(s_{i,j})] \cdot [T(v_1)])], [f_{i,j}])$$

As shown in FIG. 2F, the result of the group-by operation 150 can be output based on the relational table 241. For example, empty groups (e.g., groups with 0 count) are removed from the result of the group-by operation 150. For another example, aggregate results 242 in the form of secret shares can be decoded to the actual value, by combining secret shares possessed by different parities. As such, when the user sending the query receives the result of the group-by operation 150, the user can be informed of properties of different groups of entities, while information about individual entities is not revealed to the user, or to other parties participating in the computation.

Figure 3:
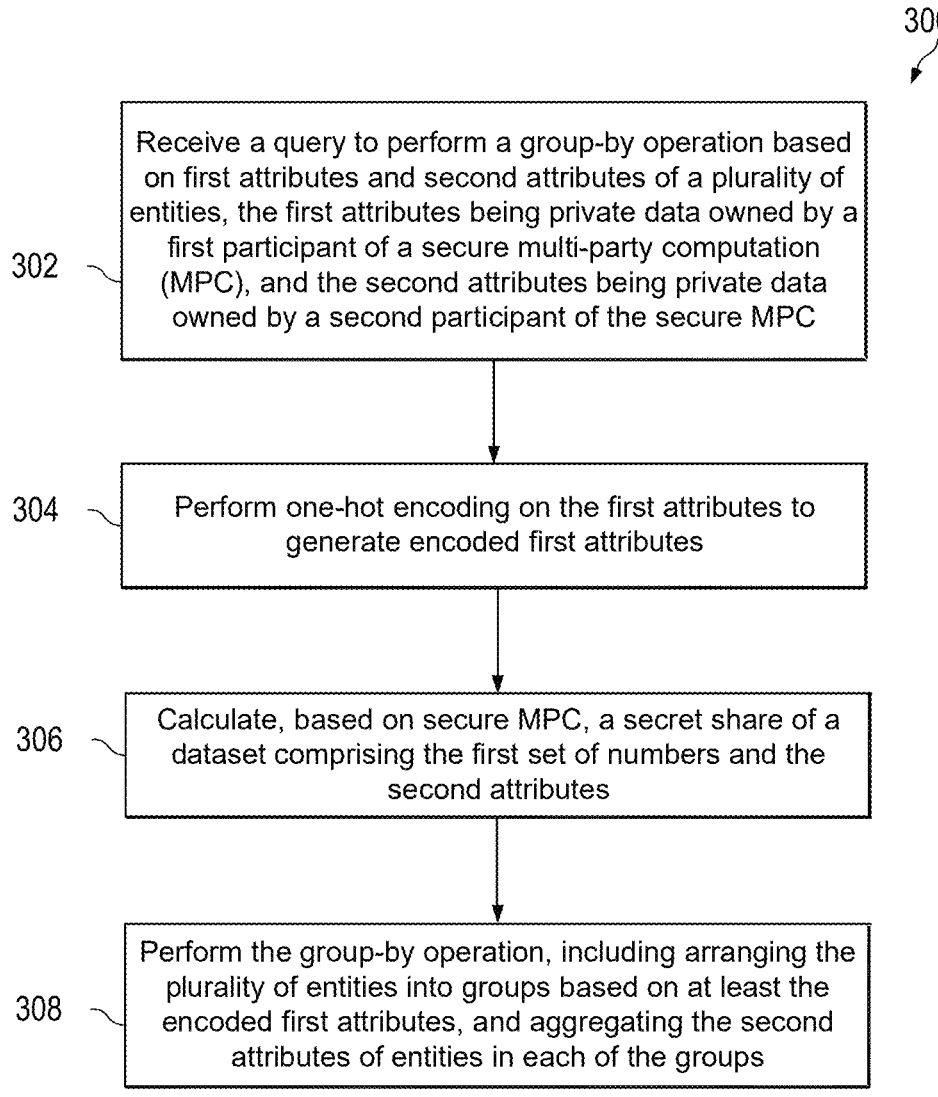
FIG. 3 illustrates a flow chart of the example method of performing a group-by operation as shown in FIGS. 2A-2F.

FIG. 3 illustrates a flow chart of the example method 300 of performing a group-by operation as shown in FIGS. 2A-2F. The operations shown in method 300 may not be exhaustive and that other operations can be performed as well before, after, or in between any of the illustrated operations. Further, some of the operations may be performed simultaneously, or in a different order than shown in FIG. 3. In some implementations, some of the operations may be performed by a computer, or multiple computers based on secure MPC.

At 302, a query is received to perform a group-by operation based on first attributes (e.g., first attributes 111 of FIG. 1) and second attributes (e.g., second attributes 120 of FIG. 1) of a plurality of entities. The first attributes are private data owned by a first participant of a secure multi-party computation (MPC), and the second attributes are private data owned by a second participant of the secure MPC. In some implementations, the first attributes are stored in a first relational table (e.g., the first relational table 101 of FIG. 1) in a first relational database accessed by the first participant, and the second attributes are stored in a second relational table (e.g., the second relational table 102 of FIG. 1) in a first relational database accessed by the second participant. In some implementations, the first attributes are used to group the entities into different groups in the group-by operation, and the second attributes will be aggregated in the group-by operations.

In some implementations, the group-by operation is further based on third attributes (e.g., third attributes 112 in the second relational table 102 of FIG. 1) that are private data owned by the second participant. In the group-by operation, the entities can be grouped into groups based on both the first attributes and the third attributes.

At 304, the first participant performs one-hot encoding on the first attributes to generate encoded first attributes (e.g., encoded first attributes 211 of FIG. 2A). The first attributes can be non-numerical data that cannot be directly computed. For example, by converting the first attributes to binary vectors, the computation process for the group-by operation can be simplified. In some implementations, as shown in FIG. 2A, the first attributes each belong to one of N1 categories. Each category of the first attributes can be represented by a unique binary vector in a length of N1. One position in the vector is marked with a "1" to indicate the presence of the category, and all other positions in the vector are marked with "0".

In some implementations, the second participant performs one-hot encoding on the third attributes to generate encoded third attributes (e.g., encoded third attributes 212 of FIG. 2B). The third attributes can be non-numerical data that cannot be directly computed. In some implementations, as shown in FIG. 2B, the third attributes each belong to one of N2 categories, and each category of the third attributes can be represented by a unique binary vector in a length of N2.

At 306, a secret share of a dataset (e.g., the third relational table 230 of FIG. 2C) including encoded first attributes and the second attributes is calculated based on secure MPC. In some implementations, the dataset also includes encoded third attributes. The first participant and the second participant both participate in the secure MPC to calculate the secret shares of the data, and each party receives a secret share of the dataset.

At 308, the group-by operation is performed based on the secret share of the dataset. The group by operations include arranging the plurality of entities into groups based on at least the encoded first attributes, and aggregating the second attributes of entities in each of the groups. In some implementations, the encoded first attribute and the encoded third attribute of each entity are multiplied to form a multiplication result (e.g., multiplication result 232 of FIG. 2E). By arranging entities having the same multiplication result into the same group, entities having the same first attribute and the same third attribute are grouped together. Second attributes of entities in each group are aggregated, e.g., using one of an aggregate function (e.g., SUM, COUNT, COUNT DISTINCT, PERCENTILE, AVG, MAX or MIN). As such, the result of the group-by operation (e.g., the result of the group-by operation 150 of FIG. 2F) can provide a summary statistic on the second attributes for each group.

FIGS. 4A-4F illustrate another example method of performing a group-by operation based on secure multi-party computation (MPC).

Figure 4A:
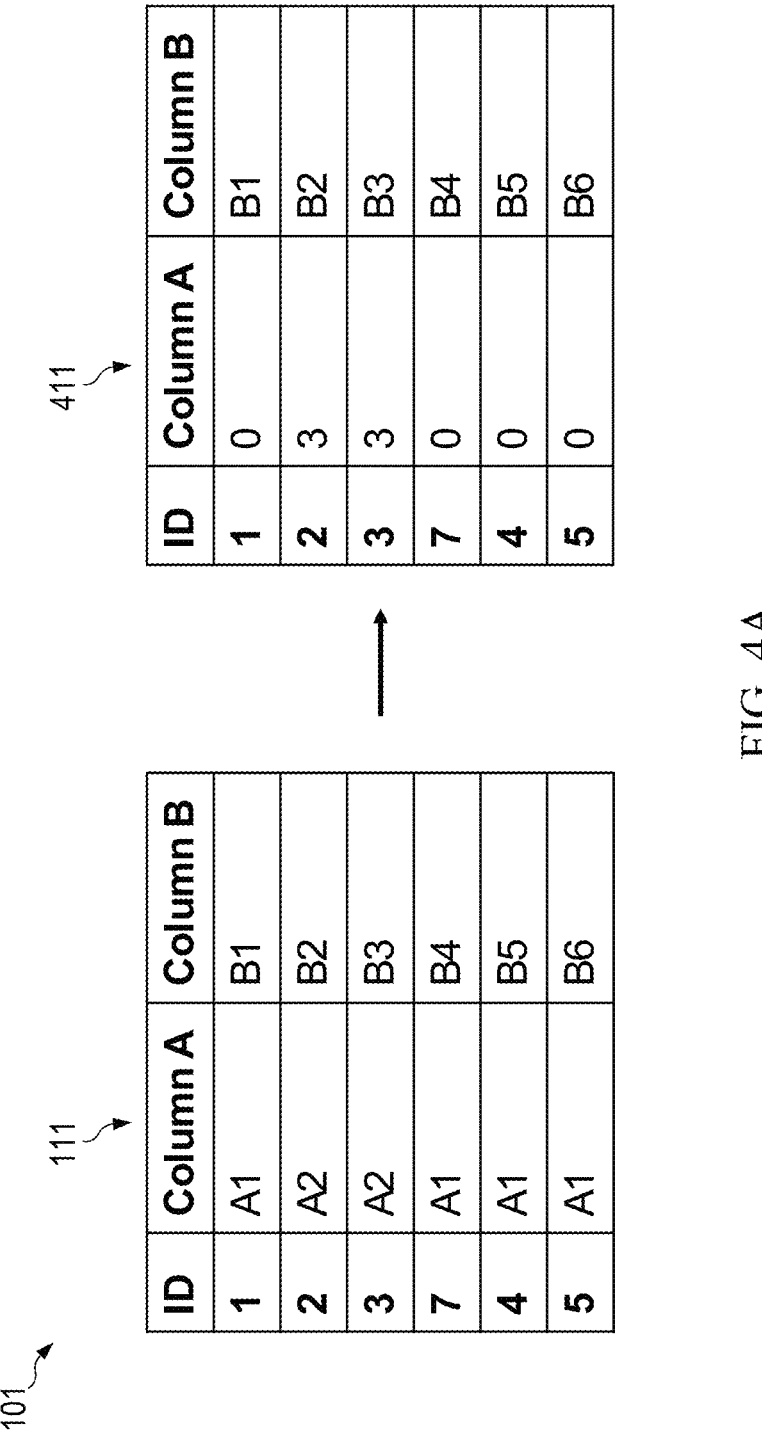

As shown in FIG. 4A, before performing secure MPC, the first party can perform a local operation on the first relational table 101. In some implementations, the first attributes 111 in the first relational table 101 include non-numerical data, e.g., categorical data, that each belong to one of a first set of categories. For example, the first set of categories include two categories, A1 and A2. The local operation includes converting the non-numerical data of the first attributes 111 to numerical data, by mapping the first attributes 111 to a first set of numbers. The first set of categories each correspond to a number of the first set of numbers, so that first attributes 111 that belong to a same category are mapped to a corresponding number of the first set of numbers. As an example, first attributes 111 that belong to the category A1 are mapped to the number "0", and first attributes 111 that belong to the category A2 are mapped to the number "3". As such, the first attributes 111 in non-numerical data are converted into encoded first attributes 411 in numerical data.

As one example, a first encoding map ($E_{kA}$) that provides a mapping relation between the first set of categories and the first set of numbers can be defined as:

$$E_{kA}[C_{kA,i}] = i \times m_{kB} (0 \le i < m_{kA})$$

where $C_{kA,i}$ represents a category of the first set of categories, $m_{kA}$ represents a number of categories in the first set of categories, and $m_{kB}$ represents a number of categories in a second set of categories, which the third attributes 112 belong to.

According to the first encoding map ($E_{kA}$), the first attributes 111 can be mapped to the first set of number by:

$$T_A(k'_A[j]) = E_{kA}[T_A(k_A[j])](0 \le j < N)$$

where N represents a number of entities in the first relational table 101, $T_A(k_A[j])$ represents a non-numerical value in the first attributes 111, and $T_A(k'_A[j])$ represents a numerical value that corresponds to the non-numerical value after mapping.

Figure 4B:
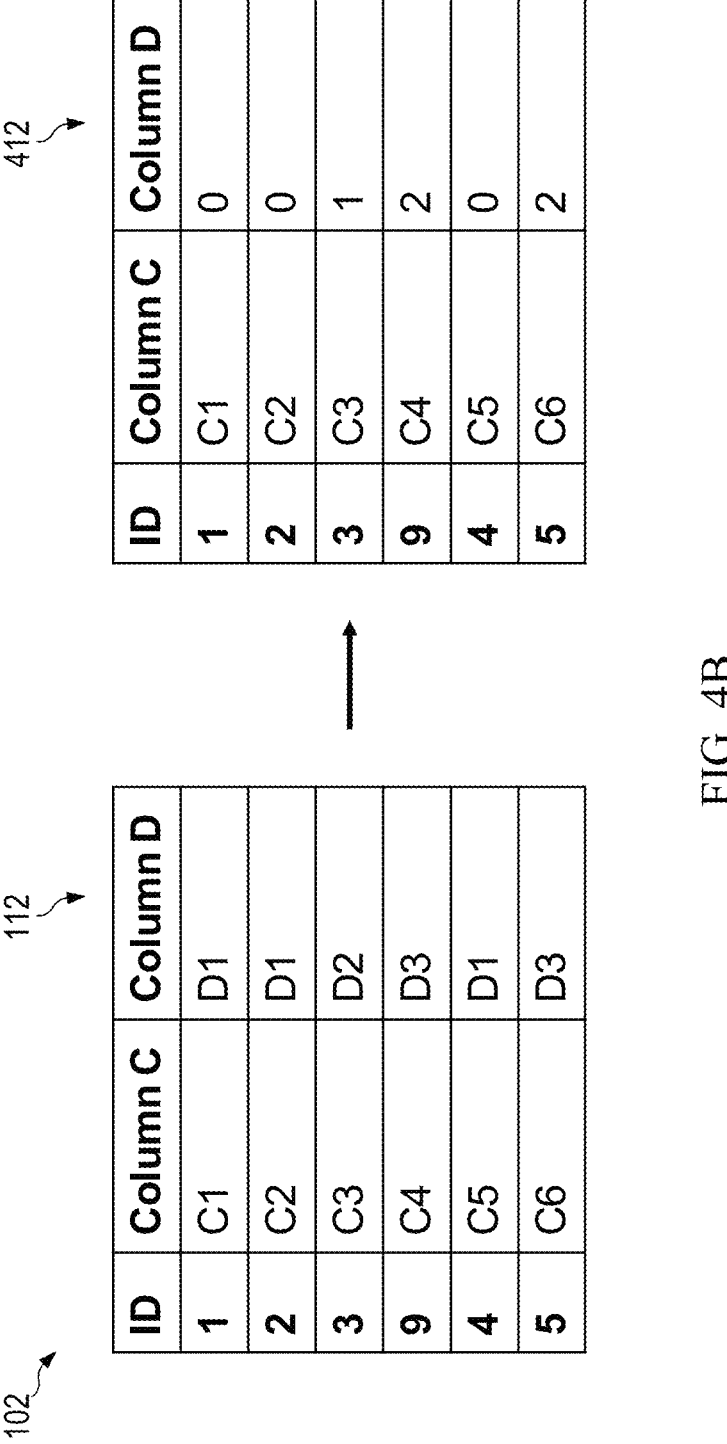

Similarly, as shown in FIG. 4B, before performing secure MPC, the second party can perform a local operation on the second relational table 102. In some implementations, the third attributes 112 in the second relational table 102 include non-numerical data, e.g., categorical data, that each belong to one of a second set of categories. For example, the second set of categories include three categories, D1, D2 and D3. The local operation includes converting the non-numerical data of the third attributes 112 to numerical data, by mapping the third attributes 112 to a second set of numbers. The second set of categories each correspond to a number of the second set of numbers, so that third attributes 112 that belong to a same category are mapped to a corresponding number of the second set of numbers. As an example, third attributes 112 that belong to the category D1 are mapped to the number "0", third attributes 112 that belong to the category D2 are mapped to the number "1", and third attributes 112 that belong to the category D3 are mapped to the number "2". In some implementations, the second attributes 120 in the first relational table 101 include numerical data that can be computable by a computer.

As one example, a second encoding map ($E_{kB}$) that provides a mapping relation between the second set of categories and the second set of numbers can be defined as:

$$E_{kB}[C_{kB,i}] = i (0 \le i < m_{kB})$$

where $C_{kB,i}$ represents a category of the second set of categories, and $m_{kB}$ represents a number of categories in the second set of categories.

According to the second encoding map ($E_{kB}$), the third attributes 112 can be mapped to the second set of number by:

$$T_B(k'_B[j]) = E_{kB}[T_B(k_B[j])](0 \le j < N)$$

where N represents a number of entities in the second relational table 102, $T_B(k'_B[j])$ represents a non-numerical value in the third attributes 112, and $T_B(k'_B[j])$ represents a numerical value that corresponds to the non-numerical value after mapping. As such, the third attributes 112 in non-numerical data are converted into encoded third attributes 412 in numerical data.

A joint encoding map ($E_{kA \otimes B}$) can record the first encoding map ($E_{kA}$) and the second encoding map ($E_{kB}$):

$$E_{kA \otimes B}[C_{kA,i} \otimes C_{kB,j}] = i \times m_{kB} + j (0 \leq i < m_{kA}, 0 \leq j < m_{kB})$$

The first party and the second party can both store the joint encoding map ($E_{kA \otimes B}$), for later use.

In some implementations, the first encoding map ($E_{kA}$) and the second encoding map ($E_{kB}$) can provide mapping relations different from the above example, as long as the sum of any number from the first set of numbers and any number from the second set of numbers is unique, with no duplicates. As example, $E_{kA}[C_{kA,i}]=i$, $0 \leq i < m_{kA}$, and $E_{kB}[C_{kB,i}]=i \times m_{kA}$, $0 \leq i < m_{kB}$.

Figure 4C:
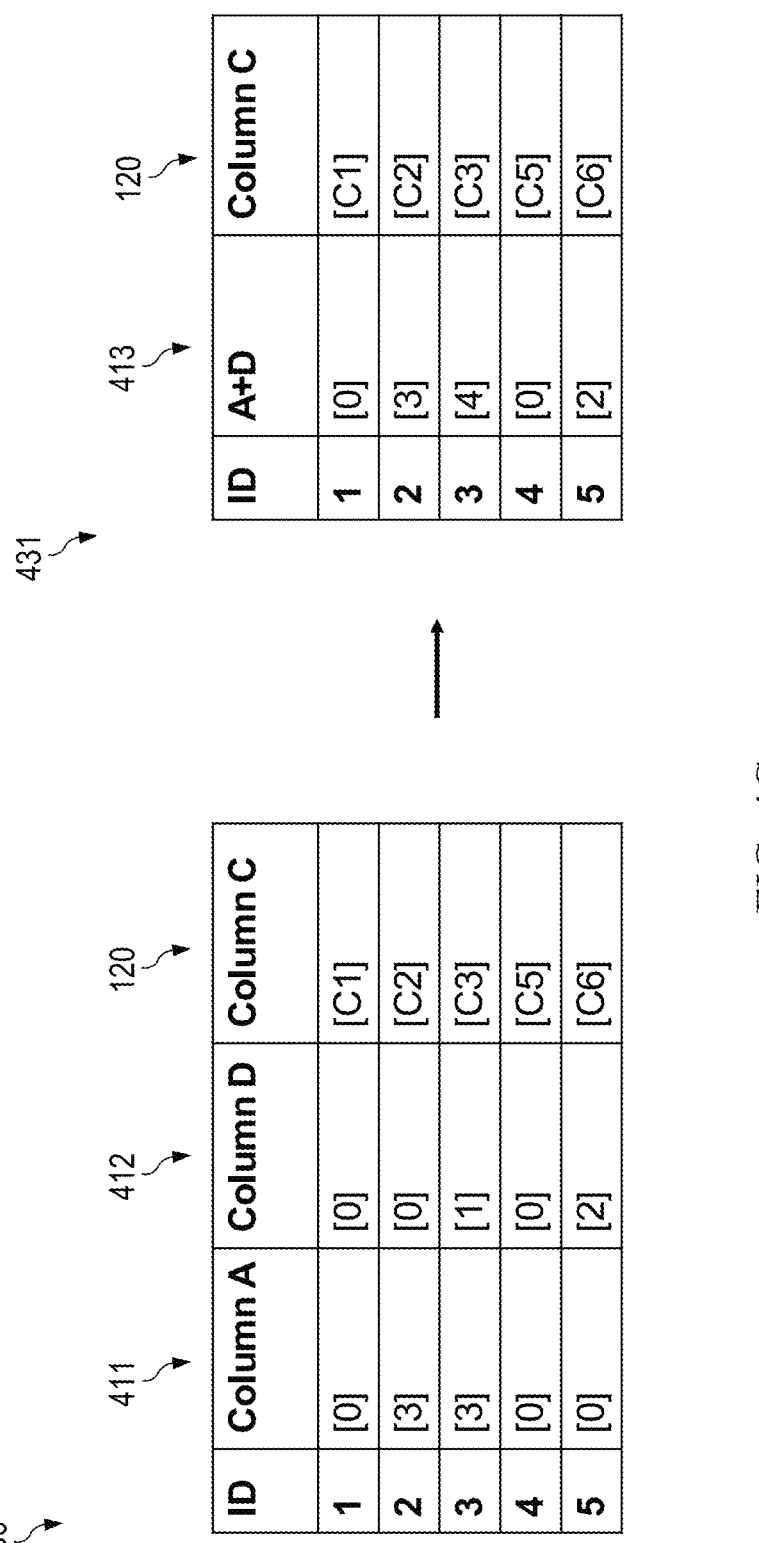

As a next step, as shown in FIG. 4C, a new dataset in the form of a third relational table 430 is generated using secure multi-party computation (MPC). The third relational table 430 includes the encoded first attributes 411, the encoded third attributes 412, and the second attributes 120. The secure MPC can provide a cryptographic protocol that enables multiple parties to jointly compute a function over their private inputs, while ensuring that no individual party can access the others' inputs. For example, the first party and second party can each generate secret shares of their respective relational table, and distribute the secret shares between the parties, so that the third relational table 430 can be generated by concatenating the secret shares. As an example in FIG. 4C, each element (e.g., x) in the third relational table 430 can be split into secret shares (e.g., denoted as [x]). The first party owns a first secret share (e.g., a random number $x_0$), and the second party owns a second secret share (e.g., $x-x_0$), so that no party is in possession of the actual value of the element.

As a more generalized formula, the first party receives a first secret share of the third relational table 430, and the second party receives a second secret share of the third relational table 430, which can be denoted as:

$$[T]_0 = ([T_A(k'_A)]_0, [T_A(v_A)]_0, [T_B(k'_B)]_0, [T_B(v_B)]_0), \text{ and}$$
$$[T]_1 = ([T_A(k'_A)]_1, [T_A(v_A)]_1, [T_B(k'_B)]_1, [T_B(v_B)]_1),$$

where $[X]_0$ represents a first secret share of X, $[X]_1$ represents a second secret share of X, $T_A(k'_A)$ represents decoded attributes in the first relational table 101 that are used to group the entities (e.g., encoded first attributes 411), $T_A(v_A)$ represents attributes in the first relational table 101 that will be aggregated (not shown in FIG. 4C), $T_B(k'_B)$ represents decoded attributes in the second relational table 102 that are used to group the entities (e.g., encoded third attributes 412), $T_B(v_B)$ represents attributes in the second relational table 102 that will be aggregated (e.g., second attributes 120).

Based on the third relational table 430, the encoded first attribute 411 and the encoded third attribute 412 of each entity can be added, based on secure MPC, to form a reconstructed third relational table 431. For each entity (e.g., in each row), the number of the encoded first attribute and the number of the encoded third attribute are added to generate a sum 413. The first party receives a first secret share of the reconstructed third relational table 431, and the second party receives a second secret share of the reconstructed third relational table 431, which can be denoted as:

$$[T]_0 = ([T(k'_{A \otimes B})]_0, [T_A(v_A)]_0, [T_B(v_B)]_0), \text{ and}$$
$$[T]_1 = ([T(k'_{A \otimes B})]_1, [T_A(v_A)]_1, [T_B(v_B)]_1),$$

where $T(k'_{A \otimes B})$ represents the sums of the encoded first attributes and the encoded third attributes.

As a next step, as shown in FIG. 4D, each element in the sums 413 ($T(k'_{A \otimes B})$) is compared, based on secure MPC, to all possible values of the sums 413 to generate comparison results 413a. For example, if the first encoding map ($E_{kA}$) is defined as $E_{kA}[C_{kA,i}]=i \times m_{kB}$, $0 \leq i < m_{kA}$, and the second encoding map ($E_{kB}$) is defined as $E_{kB}[C_{kB,i}]=i$, $0 \leq j < m_{kB}$, the possible values of the sums 413 are consecutive integers n ($0 \leq n < (m_{kA} \times m_{kA})$. In this way, each value in the sums 413 can be compared to n. For comparison results 413a in each row, "1" is added in the column corresponding to the sum, while "0" is added in other columns. The first party receives a first secret share of the comparison result 413a, denoted as $[T(k'_{A \otimes B})=n]_0$, and the second party receives a second secret share of the comparison result 413a, denoted as $[T(k'_{A \otimes B})=n]_1$.

Based on the comparison results 413a, as shown in FIG. 4E, for each entity (e.g., in each row), each value in the comparison results 413a is multiplied, based on secure MPC, with the corresponding second attribute 120. The first party receives a first secret share of the multiplication result 413b, and the second party receives a second secret share of the multiplication result 413b.

Figure 4F:
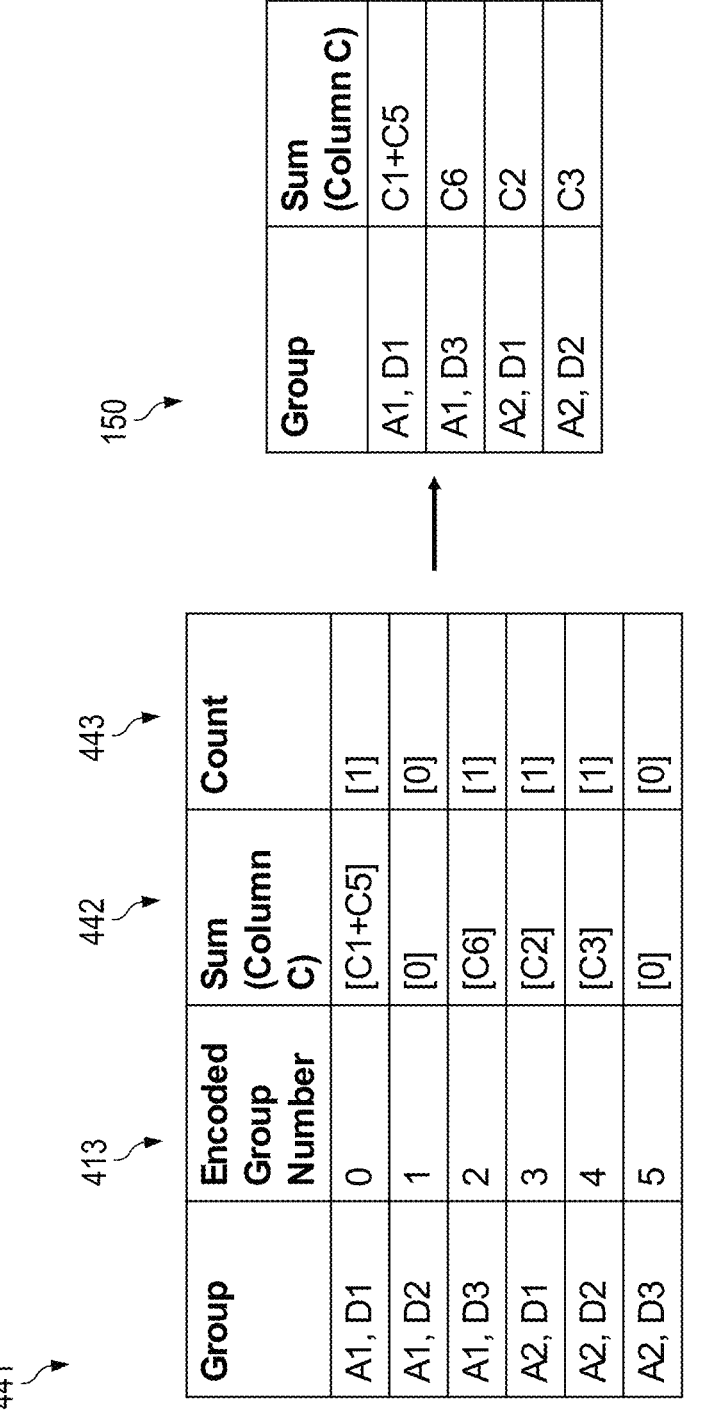

Based on the multiplication results 413b, as shown in FIG. 4F, the entities can be arranged into different groups, and the second attributes 120 can be aggregated using one of an aggregate function (e.g., SUM, COUNT, COUNT DISTINCT, PERCENTILE, AVG, MAX or MIN) for each group. In some implementations, entities with same sums 413 are grouped into the same group, and entities with different sums 13 are grouped into different groups. As such, entities with the same first attributes 111 and the same third attributes 112 are grouped into the same group, while entities with different first attributes 111 or different third attributes 112 are grouped into different groups. As shown in relational table 441, entities with A1 as the first attribute and D1 as the third attribute are grouped into a first group. Second attributes 120 of entities in the first group are aggregated to generate an aggregate result 442 (e.g., a sum of second attributes of all entities in the first group).

As a more generalized formula, an aggregation result can be $\text{Agg}([T(k'_{A \otimes B})=n] \cdot [T(v_A)])$, or $\text{Agg}[T(k'_{A \otimes B})=n] \cdot [T(v_B)]$, where $T(k'_{A \otimes B})=n$ represents the comparison result 413a, $T(v_A)$ represents attributes in the first relational table 101 to be aggregated, and $T(v_B)$ represents attributes in the second relational table 102 to be aggregated (e.g., second attributes 120).

In some implementations, a count 443 (e.g., a quantity) of entities in each group is also computed as a classification identification $f_{[n]}$:

$$f[n] = \text{count}(T(k'_{A \otimes B}) = n) > 0)$$

If the aggregate result 442 of a group is 0 and the count 443 of the groups is also 0, it means that the group is empty, rather than the aggregate results 442 (e.g., a sum, a maximum value, or a minimum value) is actually 0.

As such, the relational table 441 having aggregated attributes for each group is generated. The $n^{th}$ row of the relational table 441 can be:

$$[S_{[n]}] = (i, [Agg([T(k'_{(A \otimes B)} = n)] \cdot [T(v_A)])], [Agg([T(k'_{(A \otimes B)} = n)] \cdot [T(v_B)])], [f[n]])$$

As shown in FIG. 4F, the result of the group-by operation 150 can be output based on the relational table 441. For example, sums 413 can be converted back to categories 451 based on the joint encoding map ($E_{kA \otimes B}$). For example, empty groups (e.g., groups with 0 count) are removed from the result of the group-by operation 150. For another example, aggregate results 442 in the form of secret shares can be decoded to the actual value, by combining secret shares possessed by different parities. As such, when the user sending the query receives the result of the group-by operation 150, the user can be informed of properties of different groups of entities, while information about individual entities is not revealed to the user, or to other parties participating in the computation.

FIG. 5 illustrates a flow chart of the example method 500 of performing a group-by operation as shown in FIGS. 4A-4F. The operations shown in method 500 may not be exhaustive and that other operations can be performed as well before, after, or in between any of the illustrated operations. Further, some of the operations may be performed simultaneously, or in a different order than shown in FIG. 5. In some implementations, some of the operations may be performed by a computer, or multiple computers based on secure MPC.

At 502, a query is received to perform a group-by operation based on first attributes (e.g., first attributes 111 of FIG. 1) and second attributes (e.g., second attributes 120 of FIG. 1) of a plurality of entities. The first attributes are private data owned by a first participant of a secure multiparty computation (MPC), and the second attributes are private data owned by a second participant of the secure MPC. In some implementations, the first attributes are stored in a first relational table (e.g., the first relational table 101 of FIG. 1) in a first relational database accessed by the first participant, and the second attributes are stored in a second relational table (e.g., the second relational table 102 of FIG. 1) in a first relational database accessed by the second participant. In some implementations, the first attributes are used to group the entities into different groups in the group-by operation, and the second attributes will be aggregated in the group-by operations.

In some implementations, the group-by operation is further based on third attributes (e.g., third attributes 112 in the second relational table 102 of FIG. 1) that are private data owned by the second participant. In the group-by operation, the entities can be grouped into groups based on both the first attributes and the third attributes.

At 504, the first participant maps the first attributes to a first set of numbers (e.g., encoded first attributes 411 of FIG. 4A). The first attributes can be non-numerical data that cannot be directly computed. For example, by mapping the first attributes to the first set of numbers, the computation process for the group-by operation can be simplified. In some implementations, as shown in FIG. 4A, the first attributes each belong to one of a first set of categories, and first attributes in the same category are mapped to a corresponding one of the first set of numbers.

In some implementations, the second participant maps the third attributes to a second set of numbers (e.g., encoded third attributes 412 of FIG. 4B). The third attributes can be non-numerical data that cannot be directly computed. In some implementations, as shown in FIG. 4B, the third attributes each belong to one of a second set of categories, and first attributes in the same category are mapped to a corresponding one of the first set of numbers.

At 506, a secret share of a dataset (e.g., the third relational table 430 of FIG. 4C) including the first set of numbers and the second attributes is calculated based on secure MPC. The first participant and the second participant both participate in the secure MPC to calculate the secret shares of the data, and each party receives a secret share of the dataset.

At 508, the group-by operation is performed based on the secret share of the dataset. The group by operations include arranging the plurality of entities into groups based on at least the first set of numbers, and aggregating the second attributes of entities in each of the groups. In some implementations, the encoded first attribute and the encoded third attribute of each entity are added for each entity to form a sum (e.g., sum 413 of FIG. 4C). By arranging entities having the same sum into the same group, entities having the same first attribute and the same third attribute are grouped together. Second attributes of entities in each group are aggregated, e.g., using one of an aggregate function (e.g., SUM, COUNT, COUNT DISTINCT, PERCENTILE, AVG, MAX or MIN). As such, the result of the group-by operation (e.g., the result of the group-by operation 150 of FIG. 4F) can provide a summary statistic on the second attributes for each group.

Figure 6:
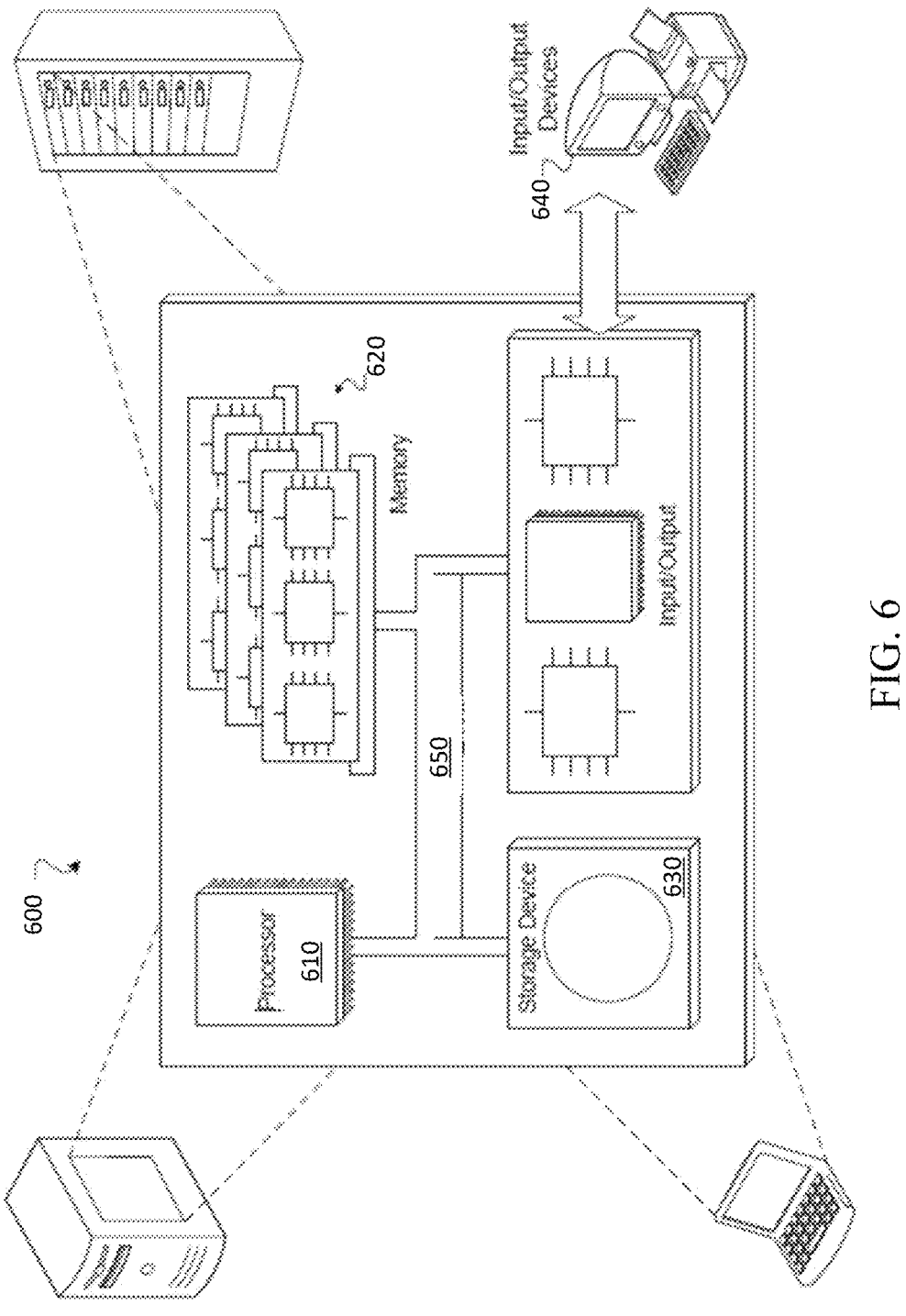
FIG. 6 illustrates a schematic diagram of an example computing system.

FIG. 6 illustrates a schematic diagram of an example computing system 600. The system 600 can be used for the operations described in association with the implementations described herein. For example, the system 600 may be included in computing devices of the one or more online components and/or the one or more offline components. The system 600 includes a processor 610, a memory 620, a storage device 630, and an input/output device 640, which are interconnected using a system bus 650. The processor 610 is capable of processing instructions for execution within the system 600. In some implementations, the processor 610 is a single-threaded processor. The processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. The memory 620 can be a volatile memory unit or a non-volatile memory unit. The storage device 630 is capable of providing mass storage for the system 600. The storage device 630 is a computer-readable medium. The storage device 630 may be a floppy disk device, a hard disk device, an optical disk device, or a tape device. The input/output device 640 provides input/output operations for the system 600. The input/output device 640 includes a keyboard and/or pointing device. The input/output device 640 includes a display unit for displaying graphical user interfaces.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random-access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship with each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any subcombination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, such operations are not required to be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations are not required in all implementations, and the described components and systems can generally be integrated together or packaged into multiple products.

Accordingly, the previously described example implementations do not define or constrain the present disclosure.

Other changes, substitutions, and alterations are also possible without departing from the spirit and scope of the present disclosure.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described example implementations, but should be defined only in accordance with the following claims and their equivalents. Accordingly, other implementations also are within the scope of the claims.

The invention claimed is:

1. A computer-implemented method, comprising:
  receiving a query to perform a group-by operation based on first attributes and second attributes of a plurality of entities, wherein the first attributes are private data owned by a first participant of a secure multi-party computation (MPC), and wherein the second attributes are private data owned by a second participant of the secure MPC;
  performing one-hot encoding on the first attributes to generate encoded first attributes;
  calculating, based on secure multi-party computation (MPC), a secret share of a dataset comprising the encoded first attributes and the second attributes; and
  performing the group-by operation comprising:
    arranging the plurality of entities into groups based on at least the encoded first attributes; and
    aggregating the second attributes of entities in each group.

2. The computer-implemented method of claim 1, wherein the first attributes are stored in a first database accessed by the first participant, and the second attributes are stored in a second database accessed by the second participant.

3. The computer-implemented method of claim 2, wherein the first database and the second database are relational databases, and wherein the query is a Structured Query Language (SQL) query.

4. The computer-implemented method of claim 3, wherein aggregating the second attributes of entities in each group is based on one of a sum, maximum, minimum, average, count, count distinct, or percentile function of the SQL query.

5. The computer-implemented method of claim 1, wherein the first attributes comprise non-numerical data, and wherein the second attributes comprise numerical data.

6. The computer-implemented method of claim 5, wherein the first attributes belong to N1 categories, and wherein performing the one-hot encoding on the first attributes comprises:
  generating, for each of the first attributes, a binary vector based on a category of the corresponding first attribute, wherein a length of the binary vector equals N1, wherein N1 is a positive integer.

7. The computer-implemented method of claim 1, further comprising:
  performing one-hot encoding on third attributes to generate encoded third attributes, wherein the third attributes are private data owned by the second participant, wherein the dataset further comprises the encoded third attributes, and wherein performing the group-by operation comprises:

arranging the plurality of entities into groups based on the encoded first attributes and the encoded third attributes.

8. The computer-implemented method of claim 7, wherein the third attributes belong to N2 categories, and wherein performing the one-hot encoding on the third attributes comprises:

generating, for each of the third attributes, a binary vector based on a category of the corresponding third attribute, wherein a length of the binary vector equals N2, wherein N2 is a positive integer.

9. The computer-implemented method of claim 1, wherein calculating the secret share of the dataset comprises:

arranging the second attributes in a descending order; and sorting the entities in the dataset corresponding to the arranged second attributes.

10. The computer-implemented method of claim 9, wherein sorting the entities in the dataset comprises:

receiving a permutation that indicates an order of the arranged second attributes; and applying the permutation to the secret share of the dataset.

11. The computer-implemented method of claim 1, wherein the first participant is a first data center of a content provider, the second participant is a second data center of the content provider, and wherein the first attributes and the second attributes comprise user attributes corresponding to the content provider.

12. One or more computer-readable storage media storing one or more instructions that, when executable by one or more computers, cause the one or more computers to perform operations comprising:

receiving a query to perform a group-by operation based on first attributes and second attributes of a plurality of entities, wherein the first attributes are private data owned by a first participant of a secure multi-party computation (MPC), and wherein the second attributes are private data owned by a second participant of the secure MPC;

performing one-hot encoding on the first attributes to generate encoded first attributes;

calculating, based on secure multi-party computation (MPC), a secret share of a dataset comprising the encoded first attributes and the second attributes; and performing the group-by operation comprising:

arranging the plurality of entities into groups based on at least the encoded first attributes; and aggregating the second attributes of entities in each group.

13. The one or more computer-readable storage media of claim 12, wherein the first attributes are stored in a first database accessed by the first participant, and the second attributes are stored in a second database accessed by the second participant.

14. The one or more computer-readable storage media of claim 12, wherein the first attributes comprise non-numerical data, and wherein the second attributes comprise numerical data.

15. The one or more computer-readable storage media of claim 14, wherein the first attributes belong to N1 categories, and wherein performing the one-hot encoding on the first attributes comprises:

generating, for each of the first attributes, a binary vector based on a category of the corresponding first attribute, wherein a length of the binary vector equals N1, wherein N1 is a positive integer.

16. The one or more computer-readable storage media of claim 12, wherein the operations further comprise:

performing one-hot encoding on third attributes to generate encoded third attributes, wherein the third attributes are private data owned by the second participant, wherein the dataset further comprises the encoded third attributes, and wherein performing the group-by operation comprises:

arranging the plurality of entities into groups based on the encoded first attributes and the encoded third attributes.

17. The one or more computer-readable storage media of claim 16, wherein the third attributes belong to N2 categories, and wherein performing the one-hot encoding on the third attributes comprises:

generating, for each of the third attributes, a binary vector based on a category of the corresponding third attribute, wherein a length of the binary vector equals N2, wherein N2 is a positive integer.

18. The one or more computer-readable storage media of claim 12, wherein calculating the secret share of the dataset comprises:

arranging the second attributes in a descending order; and sorting the entities in the dataset corresponding to the arranged second attributes.

19. The one or more computer-readable storage media of claim 18, wherein sorting the entities in the dataset comprises:

receiving a permutation that indicates an order of the arranged second attributes; and applying the permutation to the secret share of the dataset.

20. A computer-implemented system comprising:

one or more computers; and one or more computer memory devices interoperably coupled with the one or more computers and having computer-readable storage media storing one or more instructions that, when executed by the one or more computers, perform one or more operations comprising:

receiving a query to perform a group-by operation based on first attributes and second attributes of a plurality of entities, wherein the first attributes are private data owned by a first participant of a secure multi-party computation (MPC), and wherein the second attributes are private data owned by a second participant of the secure MPC;

performing one-hot encoding on the first attributes to generate encoded first attributes;

calculating, based on secure multi-party computation (MPC), a secret share of a dataset comprising the encoded first attributes and the second attributes; and performing the group-by operation comprising:

arranging the plurality of entities into groups based on at least the encoded first attributes; and aggregating the second attributes of entities in each group.

* * * * *